United States Patent
Moussaoui

(10) Patent No.: US 8,232,789 B2
(45) Date of Patent: Jul. 31, 2012

(54) SYSTEM AND METHOD FOR PROVIDING LINEAR BUCK BOOST TRANSITIONS WITHIN A BUCK BOOST CONVERTER

(75) Inventor: Zaki Moussaoui, San Carlos, CA (US)

(73) Assignee: Intersil Americas LLC, Milpitas, CA (US)

( * ) Notice: Subject to any disclaimer, the term of this patent is extended or adjusted under 35 U.S.C. 154(b) by 81 days.

(21) Appl. No.: 12/611,668

(22) Filed: Nov. 3, 2009

(65) Prior Publication Data

US 2010/0085028 A1    Apr. 8, 2010

Related U.S. Application Data

(63) Continuation-in-part of application No. 12/429,241, filed on Apr. 24, 2009.

(60) Provisional application No. 61/103,103, filed on Oct. 6, 2008.

(51) Int. Cl.
    *G05F 1/00* (2006.01)
(52) U.S. Cl. ...................................................... 323/284
(58) Field of Classification Search ................... 323/222, 323/282, 284
    See application file for complete search history.

(56) References Cited

U.S. PATENT DOCUMENTS

| 4,395,675 | A |   | 7/1983  | Toumani |         |
|-----------|---|---|---------|---------|---------|
| 6,087,816 | A |   | 7/2000  | Volk    |         |
| 6,166,527 | A | * | 12/2000 | Dwelley et al. | 323/283 |
| 2010/0019745 | A1 | * | 1/2010 | Keskar et al. | 323/271 |
| 2010/0085027 | A1 | * | 4/2010 | Moussaoui | 323/284 |

OTHER PUBLICATIONS

Linear Technology, LTC3785-1, 10V, High Efficiency, Buck-Boost Controller with Power Good, Undated.

* cited by examiner

*Primary Examiner* — Jue Zhang
(74) *Attorney, Agent, or Firm* — Howison & Arnott L.L.P.

(57) ABSTRACT

A voltage regulator, comprises first circuitry for generating an output voltage responsive to an input voltage and a plurality of switching control signal. Switching control circuitry generates the switching control signals responsive to the output voltage and at least one of a buck ramp signal and a boost ramp signal. Voltage ramp generation circuitry generates each of the buck ramp signal and the boost ramp signal. The boost ramp signal comprises the buck ramp signal offset by the peak value of the buck ramp signal.

16 Claims, 10 Drawing Sheets

SYSTEM AND METHOD FOR PROVIDING LINEAR BUCK BOOST TRANSITIONS WITHIN A BUCK BOOST CONVERTER

CROSS-REFERENCE TO RELATED APPLICATIONS

This application is a continuation in part of U.S. patent application Ser. No. 12/429,241, filed on Apr. 24, 2009, entitled SYSTEM AND METHOD FOR PROVIDING LINEAR BUCK BOOST TRANSITIONS WITHIN A BUCK BOOST CONVERTER, which claims priority from U.S. Provisional Patent Application No. 61/103,103, filed on Oct. 6, 2008, entitled BUCK-BOOST TRANSITION each of which are incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
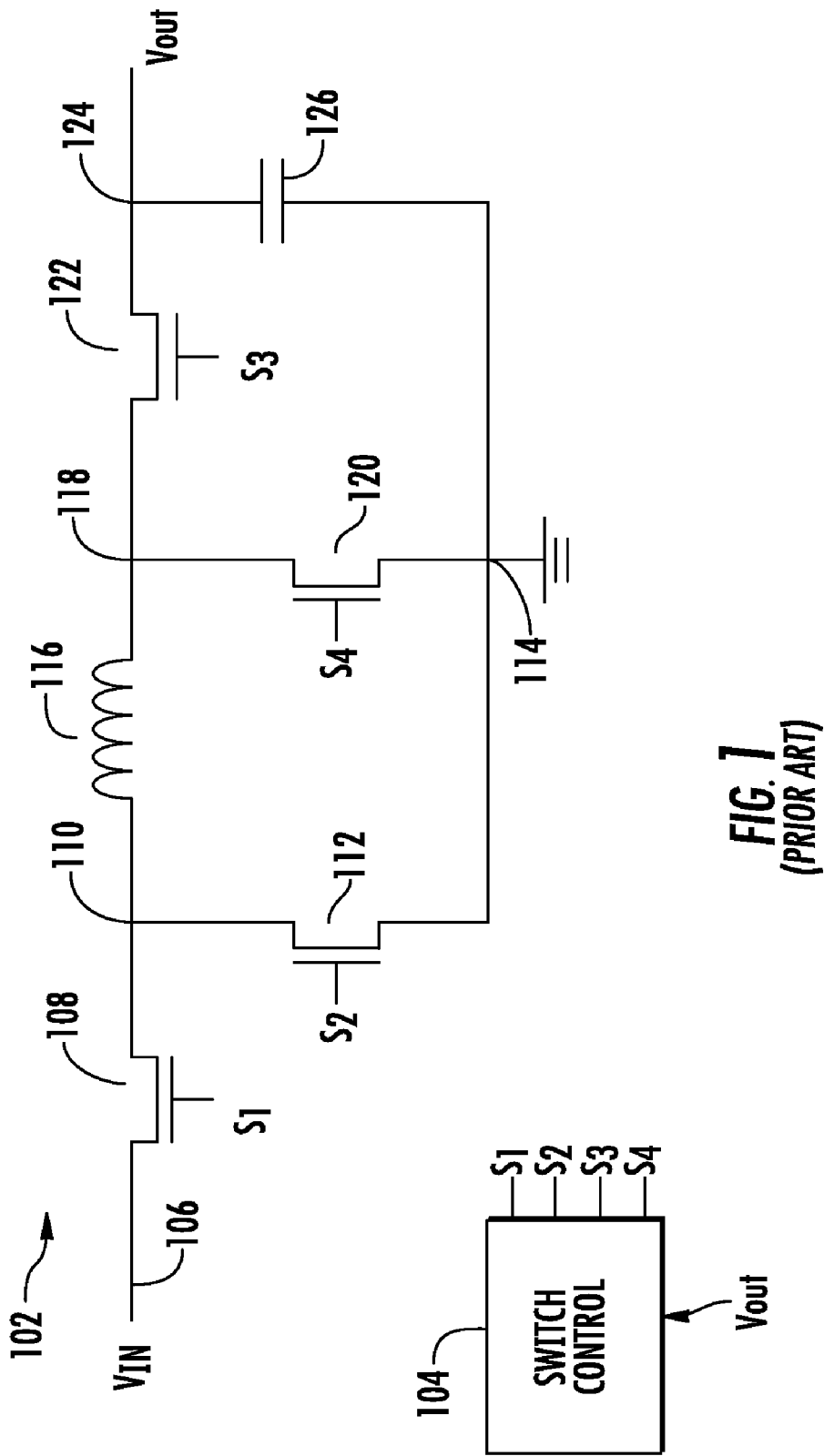
FIG. 1 is a schematic diagram of a buck boost converter.

Referring now to the drawings, wherein like reference numbers are used herein to designate like elements throughout, the various views and embodiments of a system and method for providing linear buck boost transitions within a buck boost converter are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

In many battery operated systems there may occur the situation wherein the input voltage drops below the output voltage. When this occurs a boost converter may be needed in addition to a buck converter that is providing regulated power to the system. When utilizing a buck boost converter the transition from a boost mode of operation to a buck mode of operation and vice versa is not linear. This may cause overshoot or undershoot voltage conditions to occur at the output of the buck boost voltage regulator. Thus, there is a need for providing some type of control mechanism for a buck boost regulator that provides more linear operating characteristics and substantially avoids the overshoot and undershoot voltage problems. Many existing solutions utilize the input voltage and the output voltage of the regulator to determine transition points for the buck and boost modes of operation. Additionally, these solutions set up a window around these transient points where all four switches of the buck boost converter are used in a full bridge configuration.

Referring now to FIG. 1, there is illustrated a schematic diagram of a buck boost converter 102 and associated switch control circuitry 104. The input voltage at $V_{IN}$ is applied at node 106 through a switching transistor 108. The switching transistor 108 is connected between node 106 and node 110. A second transistor 112 is connected between node 110 and the ground node 114. An inductor 116 is connected between node 110 and node 118. A transistor 120 is connected between node 118 and ground. A fourth transistor 122 is connected between node 118 and node 124 and an output capacitance 126 is connected between node 124 and ground. Node 124 comprises the output voltage node providing the output voltage $V_{OUT}$. The switch control circuitry 104 receives feedback from the output voltage node 124 as the output voltage $V_{OUT}$ and uses this information to generate switching control signals $S_1$, $S_2$, $S_3$ and $S_4$ to each of the transistors 108, 112, 120 and 122 respectively, of the buck boost regulator.

Figure 1B:
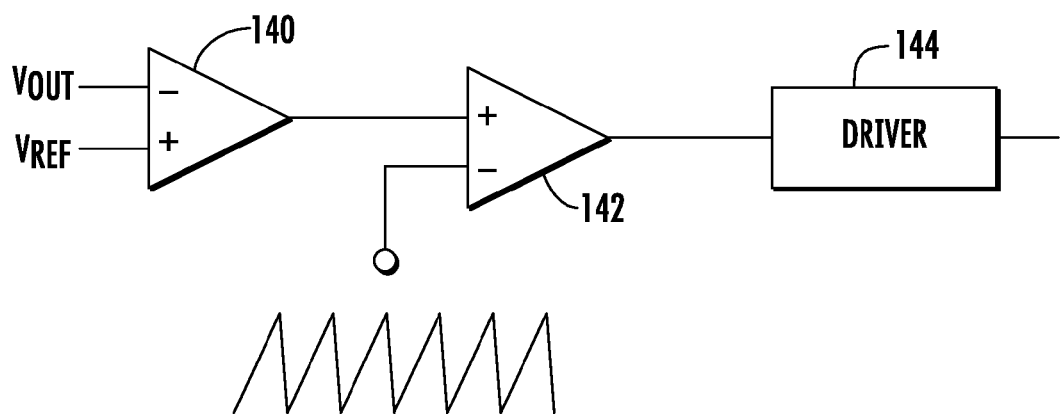
FIG. 1b illustrates the circuitry for generating a PWM signal and drive signal responsive to a ramp signal and a compensation signal.

Referring now to FIG. 1b, there is illustrated the circuitry for generating PWM switching signals to the driver circuitry of switches of the buck boost converter within the switching controller 104. A compensation signal is generated from an error amplifier 140 responsive to the output voltage $V_{OUT}$ from output voltage node 124 and a reference voltage $V_{REF}$. The compensation signal provided from the error amplifier 140 is provided to the non-inverting input of the PWM comparator 142. The inverting input of the PWM comparator 142 receives a ramp signal and responsive to the ramp signal and the compensation signal from the error amplifier 140, PWM signals are generated to the driver circuitry 144. This circuitry may be used to generate buck or boost PWM signals as described below. The driver circuitry 144 generates the drive signals to the various switching transistors of the buck boost regulator responsive to the PWM signal.

Figure 2:
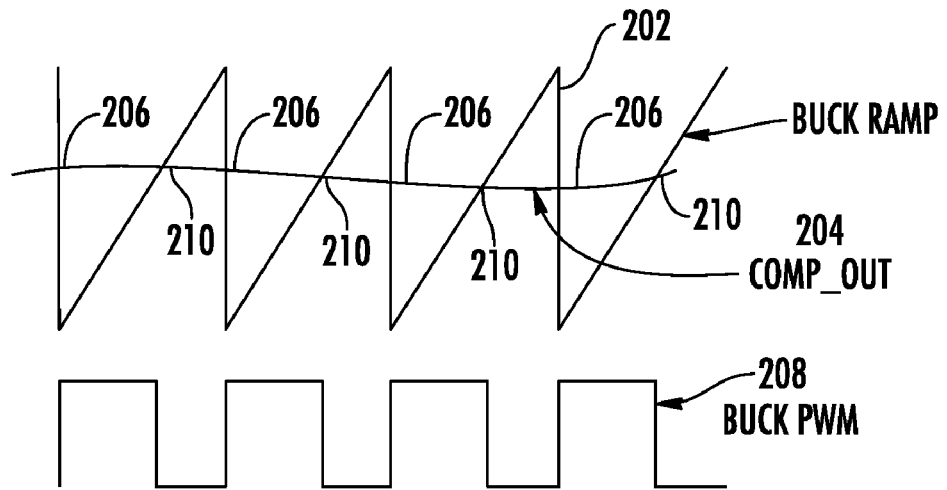
FIG. 2 illustrates a standard buck ramp controller wave form.

FIG. 2 illustrates a standard buck ramp controller signal provided within the switch controller 104. The generated buck ramp 202 is used with an output compensator signal COMP_OUT 204 to generate a buck PWM drive signal 208. The compensator signal could, for example, comprise the output of the error amplifier 140 as described herein above. As can be seen, when the buck ramp signal 202 drops below the compensator signal 204 at points 206, the buck PWM signal 208 goes to a logical "high" level. When the buck ramp signal 202 goes above the compensator signal 204, such as it does at point 210, the buck PWM signal 208 falls to a logical "low" level.

Figure 3:
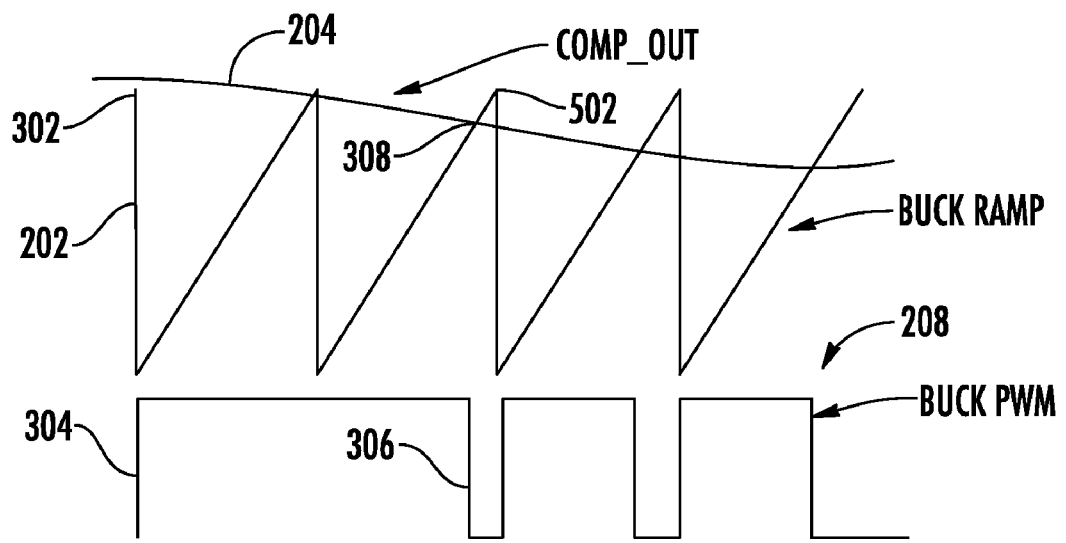
FIG. 3 illustrates a wave form of a buck ramp controller when the output voltage is decreasing or the input voltage is decreasing.

Referring now to FIG. 3, there is illustrated the buck ramp 202, compensator signal 204 and buck PWM signal 208 that occur when the output voltage of the buck converter begins to decrease or the input voltage begins to decrease. As can be seen, when the compensator signal 204 rises above the buck ramp signal peak value 302, the pulse width of the buck PWM signal 208 increases as is illustrated between points 304 and 306. This is due to the fact that when the compensator output signal 204 is above the peak ramp value 302, the PWM signal 208 goes to a logical "high" level. As the compensator signal 204 decreases and can once again intersect the buck ramp signal 202 at point 308 a determination can be made that the buck ramp signal 202 is now above the compensator signal 204 and the buck PWM signal 208 drops to a logical low level at 306. Once the compensator signal 204 drops below the peak value 302 of the buck ramp signal 202, the buck PWM output 208 operates in a similar manner to that described previously with respect to FIG. 2 wherein the buck PWM signal 208 goes to a logical "high" level when the buck ramp signal 202 is below the compensator output and goes to a logical "low" level when the buck ramp signal 202 is above the compensator output 204.

When the input voltage of the buck regulator drops below the output voltage, a boost converter is needed. However, this transition from buck to boost is not linear and may cause an undershoot or overshoot voltage condition to occur within the circuit. The present solution described herein below overcomes these overshoot and undershoot issues by using the compensator signal in order to achieve a linear transition. The boost ramp voltage signal is designed such that when the input voltage begins to decrease, the duty cycle of the buck converter will increase, but at some point the input voltage will be higher than the buck signal ramp peak as illustrated in FIG. 2. If the input voltage continues to drop, after achieving a 100% buck duty cycle, and the boost mode of operation is not activated, the output voltage of the converter will begin to drop. This will cause the compensation signal 204 to continue increasing.

Figure 4:
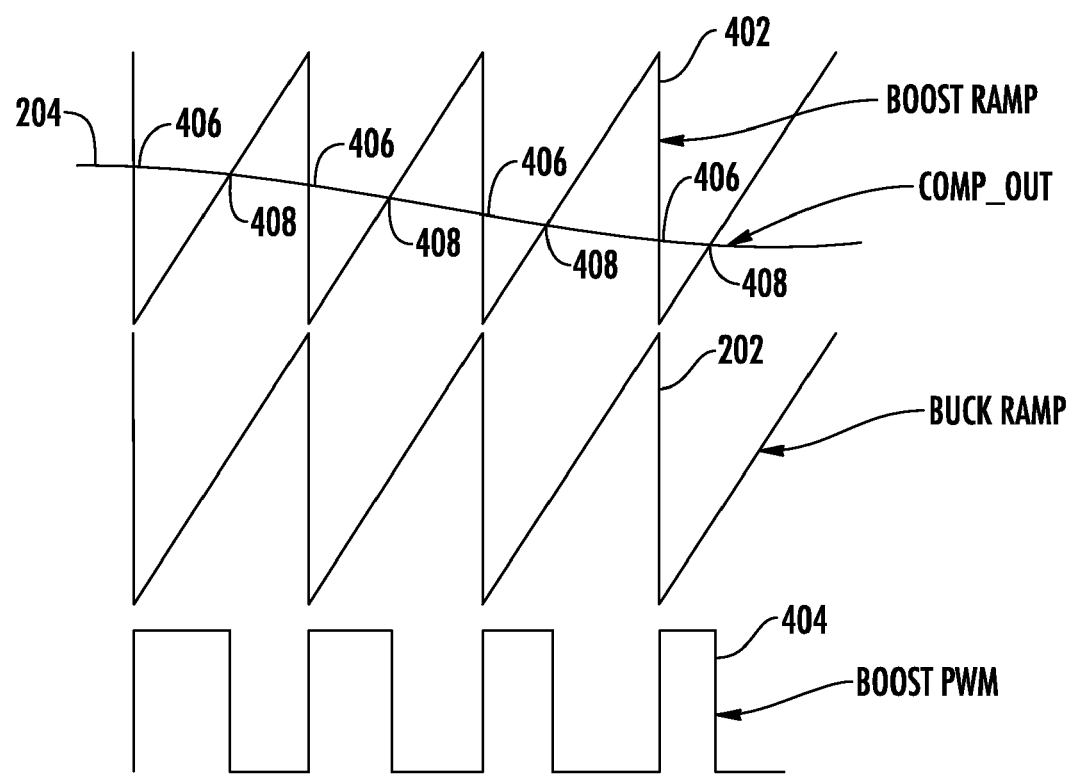
FIG. 4 illustrates the manner in which a ramp signal may be generated in a boost mode of operation of a buck boost converter.

In order to overcome this problem, as more fully illustrated in FIG. 4, the boost ramp voltage 402 may be created by offsetting the buck ramp voltage by a DC voltage level equal to the peak of the buck ramp voltage used for the buck mode of operation. This DC offset boost ramp voltage 402 may be used for the boost ramp signal during boost buck transitions or buck boost transitions to enable the operation of the converter to remain linear. When the compensator signal 204 is above the buck ramp signal 202, the buck PWM signal, as described previously with respect to FIG. 3, would remain at a logical high level providing non-linear operation. By utilizing the boost ramp signal 402 with the compensator output 204 instead of the buck ramp signal 202 a boost PWM signal 404 having linear characteristics may be generated. In this case, the boost PWM signal 404 goes to a logical high level at points 406 when boost ramp signal 402 falls below the compensator output 204. Similarly, the boost PWM signal 404 goes to a logical low level when the boost ramp signal 402 rises above the compensator signal 204 at point 408.

Figure 5:
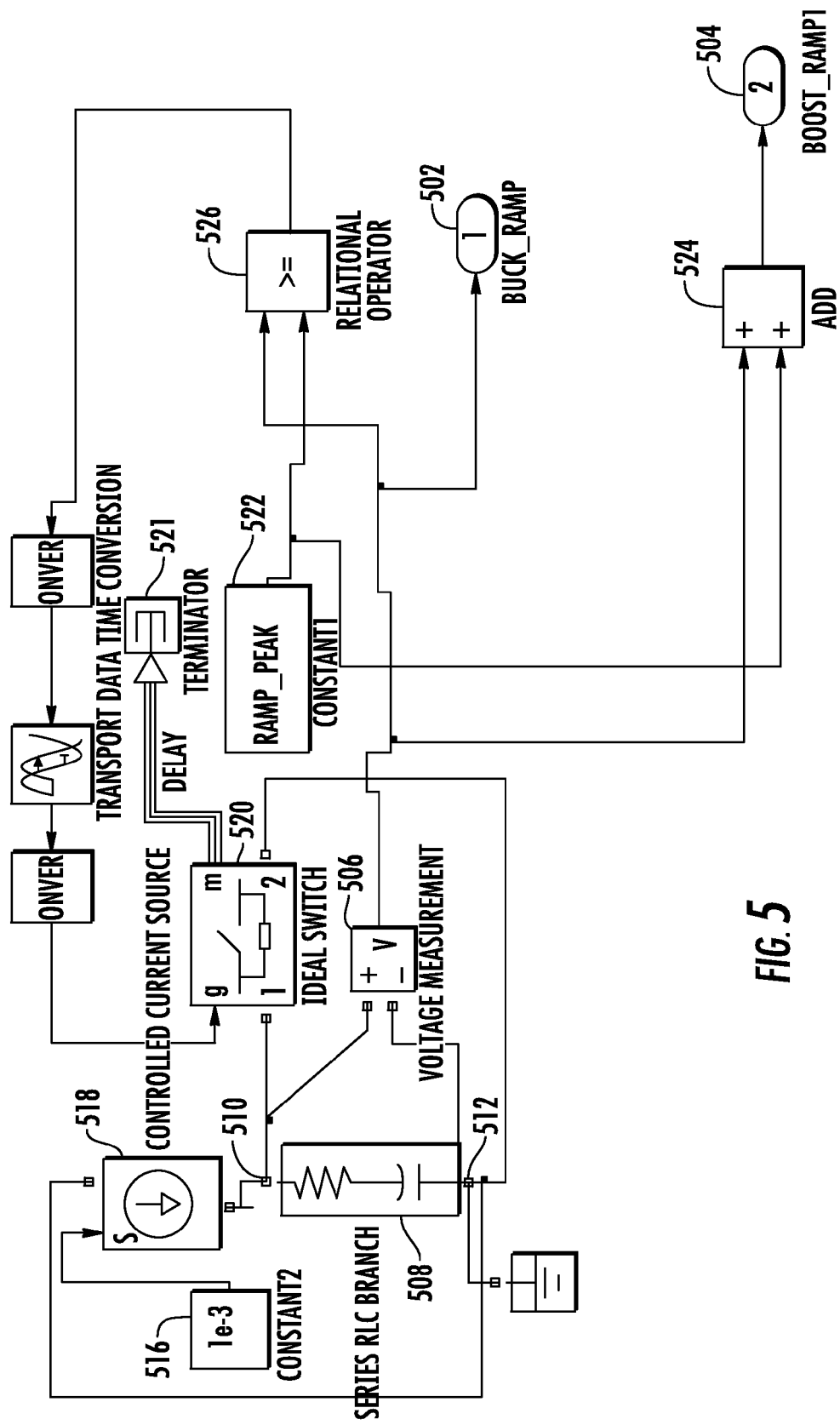
FIG. 5 is a functional block diagram of a ramp generator for a buck and boost modes of operation of a buck boost converter.

Referring now to FIG. 5, there is illustrated a block diagram of the circuitry for generating the ramp signals for the buck and boost modes of operation to generate the wave forms illustrated in FIG. 4. The buck ramp signal output 208 is provided at node 502. The boost ramp signal is provided at node 504. The buck ramp signal is provided at node 502 from a voltage measurement circuit 506. The voltage measurement circuit measures a voltage across a series RLC branch 508 comprised of a resistor in series with a capacitor. The series RLC branch 508 is connected between nodes 510 and node 512. A controlled current source 514 is connected to node 510 and receives an input from a stored constant to storage location 516. The controlled current source 518 is additionally connected to the ground node 512. An ideal switch 520 is connected between node 510 and node 512. The ideal switch 520 provides a transport data type transmission delay which is output to a terminator 521. The ideal switch 520 receives an input from a relational operator 526 that is provided through data conversion. A ramp peak of the buck ramp signal is determined at 522 and provided to the relational operator 526 that determines whether the ramp peak is greater than or equal to the voltage measurement made by the voltage measurement circuit 506 comprising the ramp voltage. The adder circuit 524 adds the ramp peak DC offset stored at location 522 with the buck ramp signal provided from voltage measurement circuit 506 to generate the boost ramp signal at node 504. In this way, the boost ramp signal is equal to the buck ramp signal plus the desired peak value DC offset.

Figure 6:
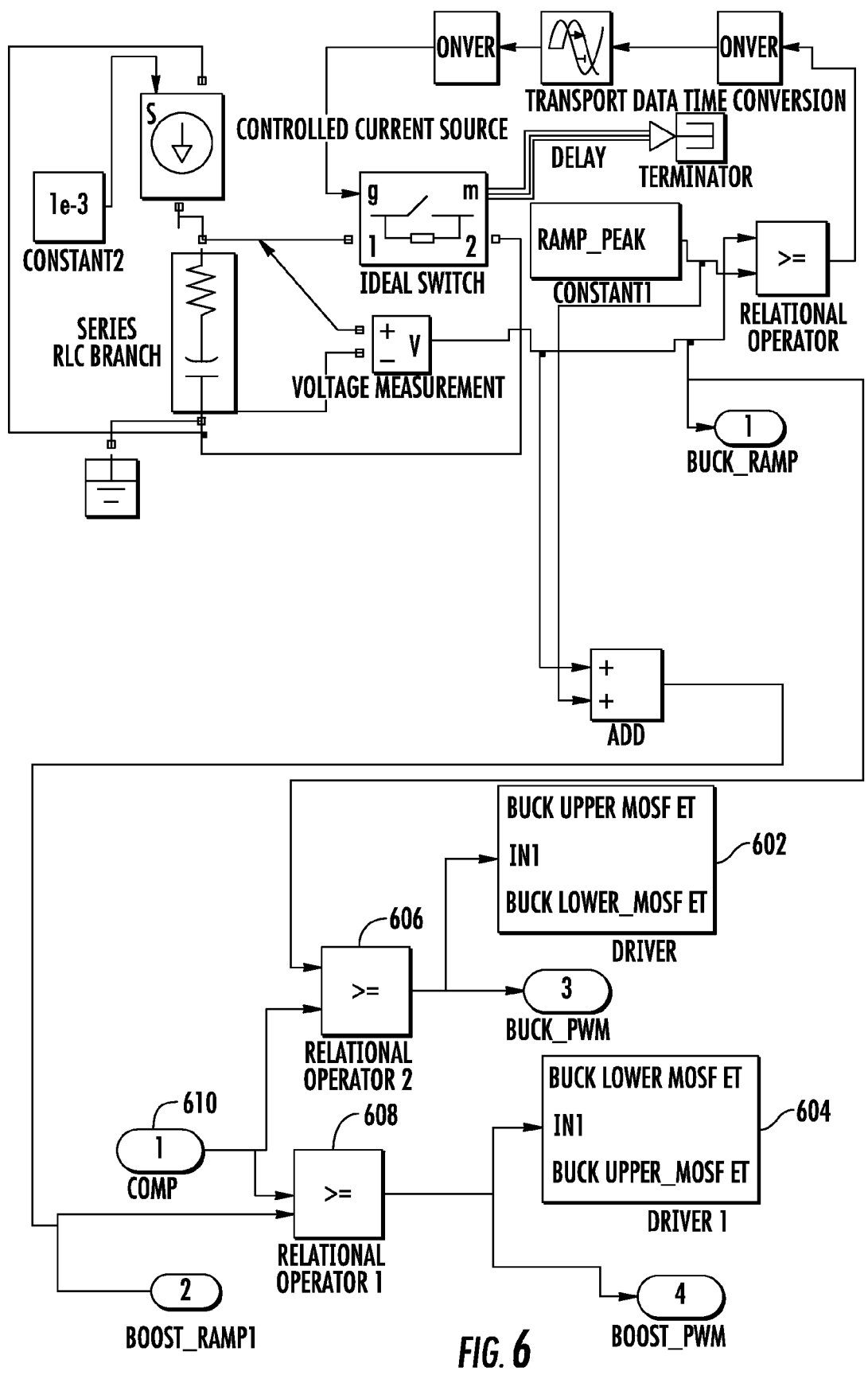
FIG. 6 illustrates the controller and driver circuits used for driving a buck boost converter.

Referring now to FIG. 6, there is illustrated the controller and driver circuitry used with the ramp generation circuitry described with respect to FIG. 5. The buck ramp signal from node 502 is provided to a first relational operator 606. The boost ramp signal from node 604 is provided to a second relational operator 608. The relational operators 606 and 608 comprise a greater than or equal to relational operation. The compensation signal 204 is provided at node 610 such that the compensation signal can be compared with both the buck ramp wave form and the boost ramp wave form. If the compensation signal is greater than the buck ramp signal, the boost ramp signal is used to drive the boost converter driver 604. If the compensation signal is not greater than the buck ramp signal, the buck ramp signal is then used to drive the buck driver 602. In this way, using comparisons of the compensation signal at node 610 with the buck ramp and boost ramp signals linear operation during switches between the buck driver 602 and the boost driver 604 may be achieved.

Referring now to FIGS. 7-11, there are illustrated various simulation results illustrating that the use of the linear compensator output provides transitions from buck to boost and from boost to buck that do not require knowledge of the input voltage level as is required by other methods. One major advantage of this system is that only two switches are used at a time rather than four as are required in previous prior art implementations thus providing an overall efficiency improvement.

Figure 7:
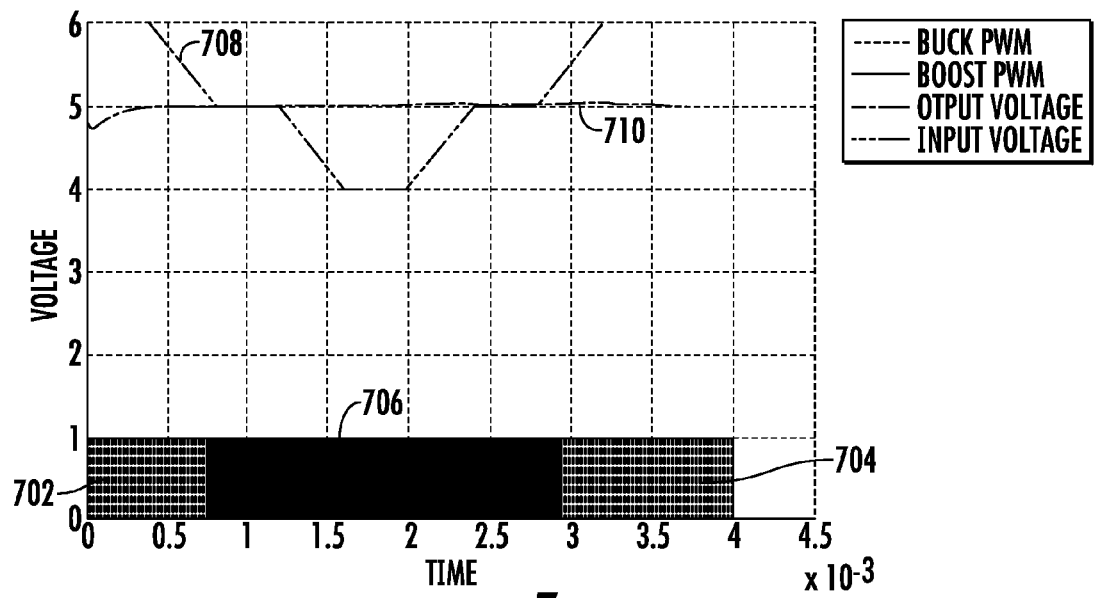
FIG. 7 illustrates the output voltage of PWM drivers for the buck boost converter when the input changes from 6 volts to 4 volts.

FIG. 7 illustrates that as the buck boost circuitry switches from buck mode of operation illustrated generally in sections 702 and 704 to the boost mode of operation illustrated generally in section 706, the input voltage illustrated by line 708 begins to drop or increase when switching from the buck mode of operation to the boost mode of operation and back. The output voltage represented by line 710 remains relatively linear.

Figure 8:
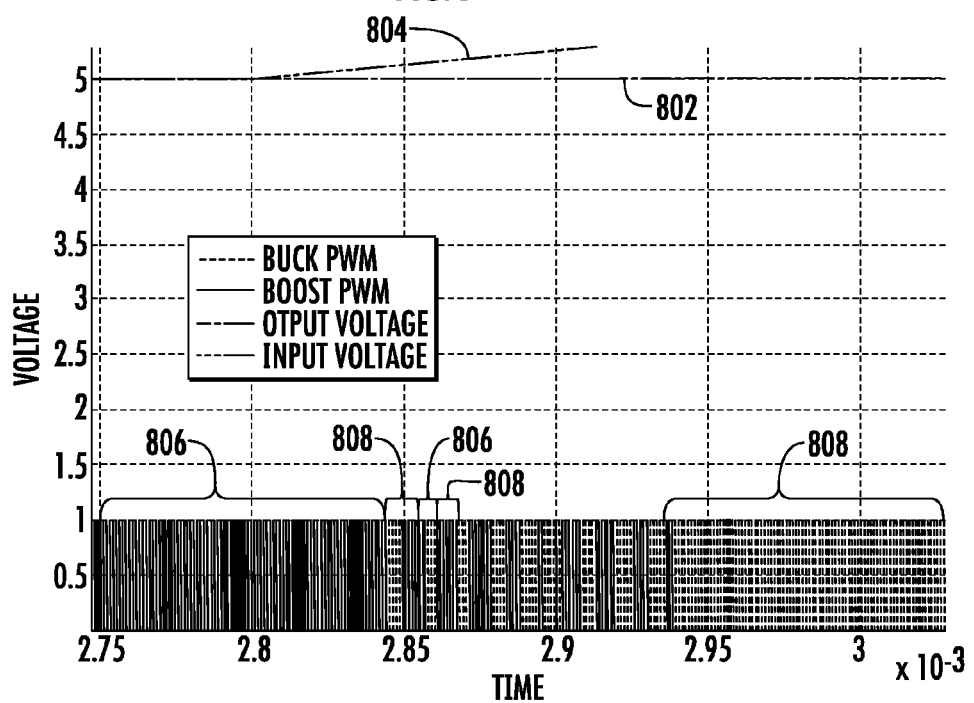
FIG. 8 illustrates a transition of the buck boost converter using the ramp generator of FIG. 4 from buck mode of operation to boost mode of operation.

FIG. 8 illustrates a number of transitions between the buck and boost modes of operation with the buck modes illustrated generally at 808 and the boost modes illustrated generally at 806. Throughout this operation, the output voltage 802 remains linear despite increases by the input voltage 804.

Figure 9:
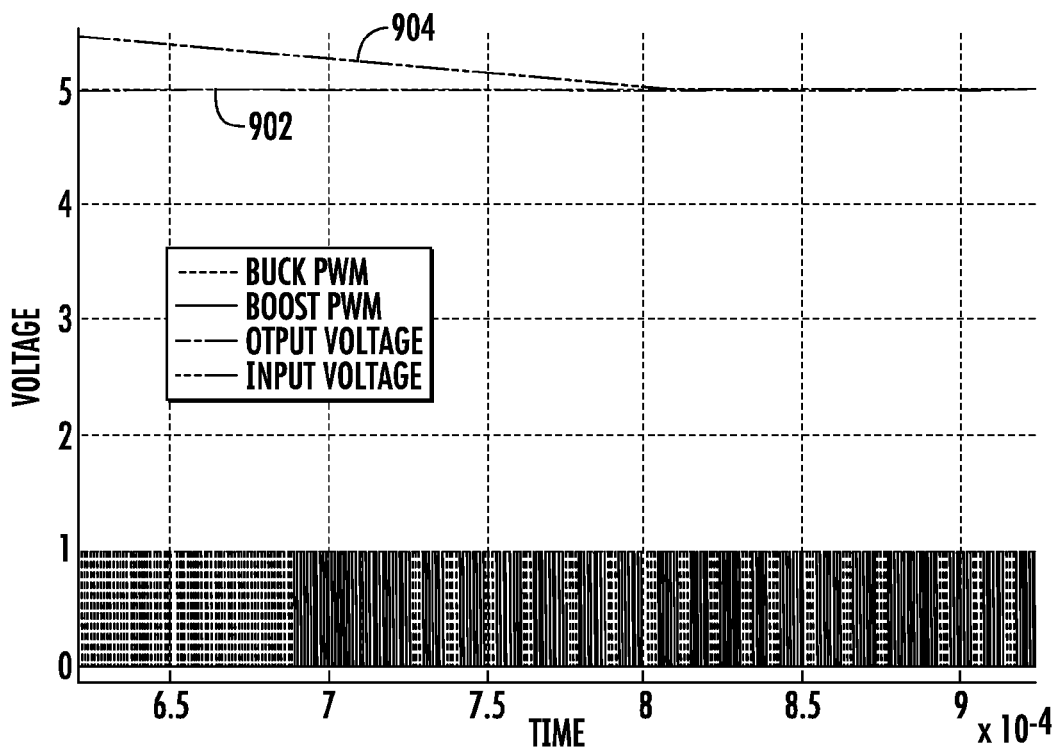
FIG. 9 illustrates the transitions from a boost mode of operation to a buck mode of operation for a buck boost converter utilizing the ramp generator of FIG. 4.

FIG. 9 illustrates a transition from a boost mode of operation to a buck mode of operation. As can be seen during the transition, the output voltage 902 remains linear despite the decreasing input voltage 904.

Figure 10:
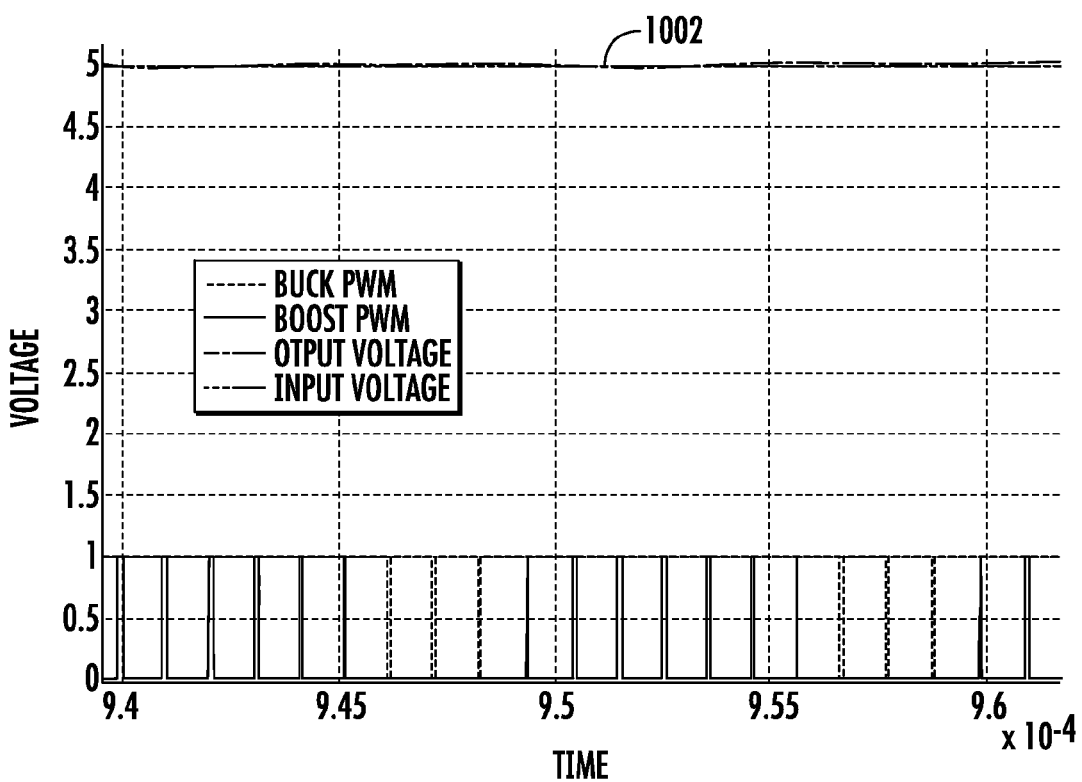
FIG. 10 illustrates the PWM drive signals between boost buck mode wherein the input voltage $V_{IN}$ is approximately equal to the output voltage $V_{OUT}$.

FIG. 10 illustrates the PWM drives during boost/buck mode wherein $V_{IN}$ is approximately equal to $V_{OUT}$. The line 1002 illustrates that the output voltage and input voltages remain linear throughout the conversion between boost and buck modes illustrated at the bottom of the figure.

Figure 11:
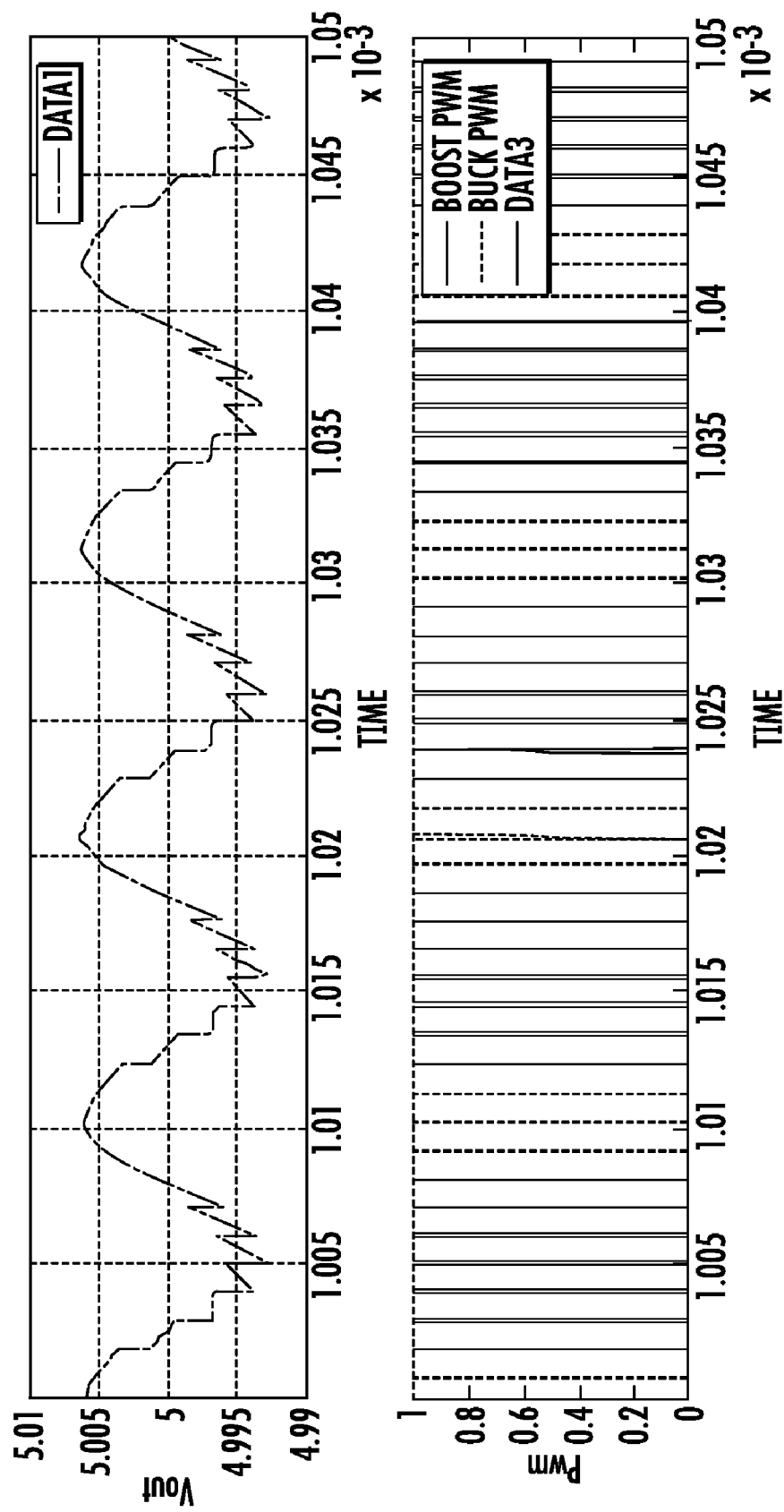
FIG. 11 illustrates the output voltage during a boost buck mode of operation wherein the input voltage $V_{IN}$ is approximately equal to the output voltage $V_{OUT}$.

FIG. 11 illustrates the manner in which the output voltage oscillates over time in a relatively linear fashion during both boost and buck modes of operation.

By implementing a proposed ramp transition scheme, transitions between boost and buck modes of operation become more linear and only depend upon the compensator output which is linear in nature. Additionally, the circuitry only requires the use of two switches within the boost and buck converters rather than four as required by prior art methods.

Figure 12:
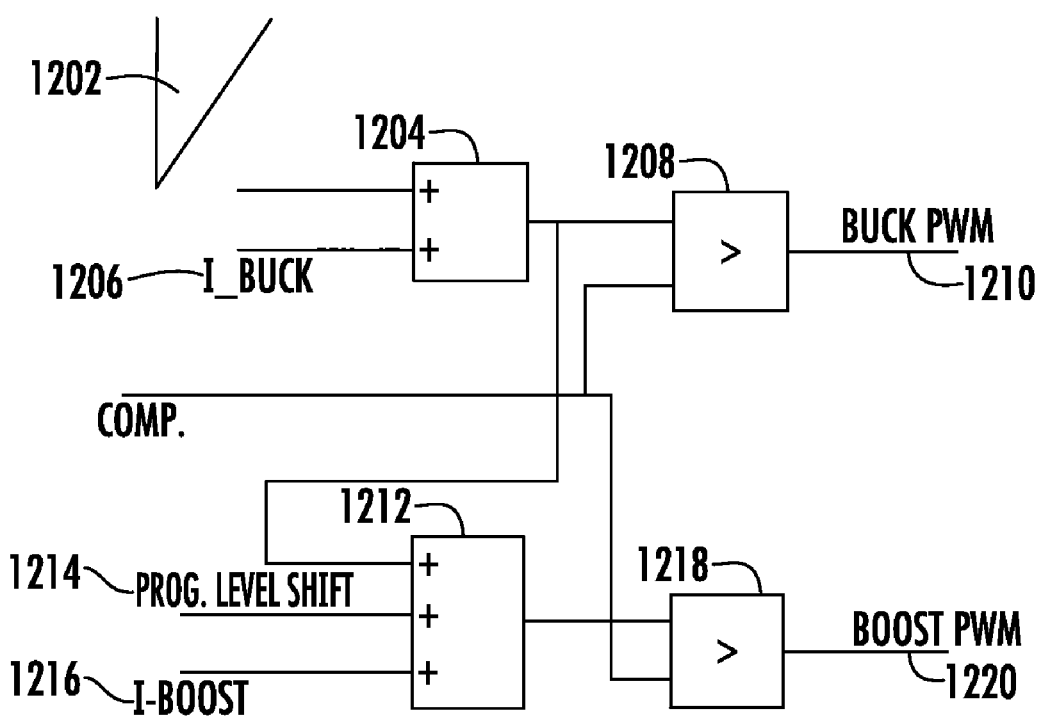
FIG. 12 illustrates an alternative embodiment to the generation of buck PWM signals and boost PWM signals responsive to a shifted ramp voltage in a current control mode.

Referring now to FIG. 12, there is illustrated an alternative embodiment for the generation of the buck PWM and boost PWM signals by the switch control circuit 104 (FIG. 1) within the buck boost voltage regulator in a current control mode. The addition of the I_BUCK and I_BOOST control of the voltage regulator ramp voltage is used in the case of a current mode control of the voltage regulator. The I_BOOST current and I_BUCK current comprise the currents across the lower switch of the boost side and the current across the upper switch of the buck side, respectively. The buck ramp voltage 1202 is applied to a first input of an adder circuit 1204. A buck current (I_BUCK) 1206 is applied to a second input of the adder circuit 1204. The current I_BUCK 1206 may be measured in three possible ways. Each of these ways requires the upper buck switch 108 (FIG. 1) to be on while the measurement is made. The I_BUCK current 1206 may be measured across the inductor 116 (FIG. 1) of the buck boost regulator. Alternatively, the I_BUCK current 1206 may be measured across a resistor in series with transistor 108. Finally, the I_BUCK current measurement 1206 may be made across the upper buck switching transistor 108.

The output of the adder circuit 1204 is provided to a comparator 1208. The other input of the comparator 1208 receives the compensation signal COMP from the error amplifier of the voltage regulator. The output of the comparator 1208 is used for generating the buck PWM signal at output 1210. The output of adder 1204 is also applied to the input of a second adder circuit 1212. The other inputs of the adder circuit 1212 are connected to receive the programmable level shift 1214 and the I_BOOST current 1216. The programmable level shift 1214 comprises the programmable level that the ramp voltage is to be shifted. The I_BOOST current 1216 comprises the boost current and can be measured in three possible manners while the lower boost switching transistor 120 is turned on. While the lower boost switching transistor 120 is turned on, the I_BOOST current can be measured across the inductor 116, across a resistor in series with transistor 120 or across the lower boost switching transistor 120. The output of the shifted ramp signal from adder 1212 is applied to the input of a comparator 1218. The other input of the comparator 1218 is connected to receive the compensation signal COMP from the error amplifier. The output of the comparator 1218 provides the boost PWM signal at output 1220.

It will be appreciated by those skilled in the art having the benefit of this disclosure that this system and method for providing linear buck boost transitions within a buck boost converter. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of generating a regulated voltage, comprising the steps of:
   generating a buck ramp signal;
   adding the buck ramp signal to a constant value equal to the peak value of the buck ramp signal to generate a boost ramp signal;
   determining whether a voltage compensation signal exceeds the peak value of the buck ramp signal;
   generating a boost PWM drive signal responsive to the boost ramp signal and the voltage compensation signal when the voltage compensation signal exceeds the peak value of the buck ramp signal;
   generating a buck PWM drive signal responsive to the buck ramp signal and the voltage compensation signal when the voltage compensation signal does not exceed the peak value of the buck ramp signal; and
   operating a voltage regulator responsive to the boost PWM drive signal and the buck PWM drive signal.

2. The method of claim 1, further including the steps of generating a compensation signal responsive to an output voltage and a reference voltage.

3. The method of claim 1, wherein the step of generating the buck PWM drive signal responsive to the buck ramp signal further comprises the steps of:
   driving the buck PWM drive signal to a logical high level when the voltage compensation signal exceeds the buck ramp signal; and
   driving the buck PWM drive signal to a logical low level when the buck ramp signal exceeds the voltage compensation signal.

4. The method of claim 1, wherein the step of generating the boost PWM drive signal responsive to the boost ramp signal further comprises the steps of:
   driving the boost PWM drive signal to a logical high level when the voltage compensation signal exceeds the boost ramp signal; and
   driving the boost PWM drive signal to a logical low level when the boost ramp signal exceeds the voltage compensation signal.

5. The method of claim 1, wherein the step of operating further comprises the step of operating the voltage regulator to provide an output voltage having a linear response responsive to the buck PWM drive signal and the boost PWM drive signal.

6. A voltage regulator, comprising:
   first circuitry for generating an output voltage responsive to an input voltage and a plurality of switching control signals;
   switching control circuitry for generating the switching control signals responsive to the output voltage and at least one of a buck ramp signal and a boost ramp signal; and
   voltage ramp generation circuitry for generating each of the buck ramp signal and the boost ramp signal, wherein the boost ramp signal is generated by adding the buck ramp signal with the peak value of the buck ramp signal to create a positive DC offset from the buck ramp signal.

7. The voltage regulator of claim 6, wherein the first circuitry comprises:
   a boost regulator portion responsive to the switching control signals; and
   a buck regulator portion responsive to the switching control signals and connected with the boost regulator portion.

8. The voltage regulator of claim 6, wherein the switching control circuitry further comprises:

compensation circuitry for generating a voltage compensation signal responsive to an output voltage and a reference voltage;

PWM circuitry for generating a buck PWM signal responsive to the voltage compensation signal and the buck ramp signal and for generating a boost PWM signal responsive to the voltage compensation signal and the boost ramp signal; and driver circuitry for generating the switching control signals responsive to the buck PWM signal and the boost PWM signal.

9. The voltage regulator of claim 8, wherein the switching control circuitry generates the buck PWM signals responsive to the compensation signal being less than the peak value of the buck ramp signal.

10. The voltage regulator of claim 8, wherein the switching control circuitry generates the boost PWM signals responsive to the compensation signal being greater than the peak value of the buck ramp signal.

11. A switching control circuit for use with a voltage regulator, comprising:

circuitry for generating the switching control signals responsive to an output voltage and at least one of a buck ramp signal and a boost ramp signal; and voltage ramp generation circuitry for generating each of the buck ramp signal and the boost ramp signal, wherein the boost ramp signal is generated by adding the buck ramp signal with the peak value of the buck ramp signal to create a positive DC offset from the buck ramp signal.

12. The voltage regulator of claim 11, wherein the circuitry for generating the switching control signals further comprises:

compensation circuitry for generating a voltage compensation signal responsive to an output voltage and a reference voltage;

PWM circuitry for generating a buck PWM signal responsive to the voltage compensation signal and the buck ramp signal and for generating a boost PWM signal responsive to the voltage compensation signal and the boost ramp signal; and driver circuitry for generating the switching control signals responsive to the buck PWM signal and the boost PWM signal.

13. The voltage regulator of claim 12, wherein the switching control circuitry generates the buck PWM signals responsive to the compensation signal being less than the peak value of the buck ramp signal.

14. The voltage regulator of claim 11, wherein the switching control circuitry generates the boost PWM signals responsive to the compensation signal being greater than the peak value of the buck ramp signal.

15. A switching control circuit for use with a voltage regulator in a current control mode, comprising:

circuitry for generating a buck PWM signal responsive to an error amplifier signal, a ramp signal and a buck current signal, wherein the circuitry for generating further comprises:

an adder for adding the ramp signal with the buck current signal;

a comparator for comparing the error amplifier signal with the output of the adder to generate the buck PWM signal; and second circuitry for generating a boost PWM signal responsive to the error amplifier signal, the ramp signal, the buck current signal, the boost current signal and a programmable shift level for the ramp signal.

16. The switching control circuit of claim 15, wherein the second circuitry for generating further comprises:

a second adder for adding the output of the adder with the boost current signal and the programmable shift level; and a second comparator for comparing the error amplifier signal with the output of the second adder to generate the boost PWM signal.

* * * * *